United States Patent
Frenne et al.

(10) Patent No.: US 12,328,170 B2
(45) Date of Patent: Jun. 10, 2025

(54) METHODS AND NODES FOR CSI REPORTING USING TRS

(71) Applicant: TELEFONAKTIEBOLAGET LM ERICSSON (PUBL), Stockholm (SE)

(72) Inventors: Mattias Frenne, Uppsala (SE); Xinlin Zhang, Västra Frölunda (SE); Fredrik Athley, Västra Frölunda (SE); Shiwei Gao, Nepean (CA); Siva Muruganathan, Stittsville (CA)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 18/712,463

(22) PCT Filed: Nov. 22, 2022

(86) PCT No.: PCT/IB2022/061282
§ 371 (c)(1),
(2) Date: May 22, 2024

(87) PCT Pub. No.: WO2023/089593
PCT Pub. Date: May 25, 2023

(65) Prior Publication Data
US 2024/0421877 A1    Dec. 19, 2024

Related U.S. Application Data

(60) Provisional application No. 63/281,830, filed on Nov. 22, 2021.

(51) Int. Cl.
*H04B 7/06* (2006.01)
*H04L 25/02* (2006.01)
*H04W 72/0446* (2023.01)

(52) U.S. Cl.
CPC ....... *H04B 7/0626* (2013.01); *H04L 25/0226* (2013.01); *H04W 72/0446* (2013.01)

(58) Field of Classification Search
CPC ................. H04L 25/03159; H04B 7/0626
(Continued)

(56) References Cited

U.S. PATENT DOCUMENTS

| 2015/0381389 A1* | 12/2015 | Zhang | H04L 5/143 370/280 |
|---|---|---|---|
| 2021/0226674 A1 | 7/2021 | Ramireddy | |

(Continued)

FOREIGN PATENT DOCUMENTS

WO    2019195171 A1    10/2019

OTHER PUBLICATIONS

3GPP TS 38.214 V16.7.0, "3rd Generation Partnership Project; Technical Specification Group Radio Access Network; NR; Physical layer procedures for data (Release 16)", Sep. 2021. https://portal.3gpp.org/desktopmodules/Specifications/SpecificationDetails.aspx?specificationId=3216.

(Continued)

*Primary Examiner* — Kiet M Doan
(74) *Attorney, Agent, or Firm* — Ericsson Inc.

(57) ABSTRACT

There is provided a method performed by a user equipment (UE). The method comprises: receiving a reference signal over multiple time instances; determining time domain properties of a channel, based on the received reference signal; and sending a report to a network node, the report comprising information about the determined time domain properties of the channel. A UE for implementing this method is also provided.

20 Claims, 12 Drawing Sheets

(58) Field of Classification Search
USPC .................................. 370/329, 330; 375/262
See application file for complete search history.

(56) References Cited

U.S. PATENT DOCUMENTS

2022/0078815 A1* 3/2022 Manolakos ....... H04W 72/0446
2023/0308241 A1* 9/2023 Liu ...................... H04L 5/0051

OTHER PUBLICATIONS

3GPP Ts 38.331 V16.6.0 (2021-09), 3rd Generation Partnership Project; Technical Specification Group Radio Access Network; NR; Radio Resource Control (RRC) protocol specification (Release 16), Sep. 2021. https://portal.3gpp.org/desktopmodules/Specifications/SpecificationDetails.aspx?specificationId=3197.

Fraunhofer Iis et al., MIMO Enhancements for Rel.-18, 3GPP TSG RAN meeting #93e , RP-212137, Electronic Meeting, pp. 1-10, Sep. 13 -17, 2021, France.

Qualcomm Incorporated: "CSI enhancement for IOT and URLLC", 3GPP Draft; R1-2103800, 3rd Generation Partnership Project (3GPP), Mobile Competence Centre ; France, vol. RAN WG1, No. e-Meeting; Apr. 12, 2021-Apr. 20, 2021 Apr. 11, 2021 (Apr. 11, 2021), 24 pages, XP051994791.

* cited by examiner

METHODS AND NODES FOR CSI REPORTING USING TRS

RELATED APPLICATIONS

This application claims the benefits of priority of U.S. Provisional Patent Application No. 63/281,830, entitled "Methods for CSI reporting using TRS" and filed at the United States Patent and Trademark Office on Nov. 22, 2021, the content of which is incorporated herein by reference.

BACKGROUND

Multi-User (MU) Multiple Input Multiple Output (MIMO)

With multi-user MIMO (MU-MIMO), two or more users in the same cell are co-scheduled on the same time-frequency resource(s). That is, two or more independent data streams are transmitted to different User Equipments (UEs) at the same time, and the spatial domain can typically be used to separate the respective streams. By transmitting several streams simultaneously, the capacity of the system can be increased. This, however, comes at the cost of reducing the Signal to Interference and Noise Ratio (SINR) per stream, as the power must be shared between streams and the streams will cause interference to each-other Channel State Information Reference Signals (CSI-RS)

For CSI measurement and feedback, CSI-RS are defined. A CSI-RS is transmitted on each antenna port and is used by a UE to measure downlink channel between each of the transmit antenna ports and each of its receive antenna ports. The transmit antenna ports are also referred to as CSI-RS ports. The supported number of antenna ports in New Radio (NR) are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain Resource Elements (REs) in a slot or in certain slots. FIG. 1 shows an example of CSI-RS REs for 12 antenna ports, where 1 RE per Radio Block (RB) per port is shown.

In addition, interference measurement resource (IMR) is also defined in NR for a UE to measure interference. An IMR resource contains 4 REs, either 4 adjacent REs in frequency in the same Orthogonal Frequency Division Multiplex (OFDM) symbol or 2 by 2 adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality.

Furthermore, a UE in NR may be configured to measure interference based on one or multiple NZP CSI-RS resources.

Tracking Reference Signal (TRS)

Due to oscillator imperfections, transmission and reception may not be synchronized in time and/or frequency, which can cause inter- and intra-symbol interference. In NR, TRS was introduced that can be used by the UE for synchronization.

In NR third generation partnership project (3GPP) specifications, TRS can be configured when CSI report setting is not configured or when the higher layer parameter 'reportQuantity' in the CSI-ReportConfig information element (IE), associated with all the report settings linked with the CSI-RS resource set containing the TRS(s) is set to 'none'. This means that CSI reporting based on measurements on TRS is not supported in NR.

TRS is configured via higher layer parameter 'trs-Info' in the NZP-CSI-RS-ResourceSet IE specified in 3GPP TS 38.331 for a CSI-RS resource set. From the 3GPP specifications perspective, TRS is specified as a special NZP CSI-RS where the corresponding NZP CSI-RS resource set containing the TRS(s) has a higher layer parameter 'trs-info' set to true.

TRS is not really a CSI-RS, rather it is a CSI-RS resource set consisting of multiple periodic NZP CSI-RS resources. More specifically, a TRS consists of four CSI-RS resources located within two consecutive slots, two CSI-RS resources in each slot. Each of the CSI-RS resources within the CSI-RS resource set is configured with a same single antenna port, a same frequency density of 3 (i.e., occupies 3 REs in an RB), and a same periodicity. The periodicity can be 10, 20, 40, or 80 ms. Note that the exact set of REs used for the TRS CSI-RS may vary. There is always a four-symbol time-domain separation between the two CSI-RS within a slot. FIG. 2 shows an example of a TRS burst of 2 TRS symbols in 2 adjacent slots (each slot comprising 14 symbols, numbered 0 to 13), where shaded REs are allocated for TRS and the numbers are OFDM symbol indices in each slot. TRS REs in only 2 RBs plus four sub-carriers are shown. NR also supports aperiodic TRS. More details of TRS can be found in 3GPP TS38.214 section 5.1.6.1.1.

For Long Term Evolution (LTE), the cell-specific reference signal (CRS) serves the same purpose as the TRS as LTE CRS can be used for synchronization but it can also be used for CSI reporting, which is not supported for TRS in NR. However, compared to the LTE CRS, the TRS implies much less overhead, only having one antenna port and only being present in two slots every TRS period.

CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report. Each CSI reporting setting contains at least the following information:

- A CSI-RS resource set for channel measurement;
- An IMR resource set for interference measurement;
- Optionally, a CSI-RS resource set for interference measurement;
- Time-domain behavior, i.e. periodic, semi-persistent, or aperiodic reporting;
- Frequency granularity, i.e. wideband or subband;
- CSI parameters to be reported such as Rank Indicator (RI), Precoding matric indicator/index (PMI), Channel Quality Indicator (CQI), and CSI-RS resource indicator (CRI) in case of multiple CSI-RS resources in a resource set;
- Codebook types, i.e. Type I or II, and codebook subset restriction;
- Measurement restriction;
- Subband size: one out of two possible subband sizes is indicated, the value range depends on the bandwidth of the bandwidth part (BWP). One CQI/PMI (if configured for subband reporting) is fed back per subband).

Type 1 and Type 2 Codebooks in NR

Type 1 codebook (CB) is typically used by a UE to report CSI for single user MIMO (SU-MIMO) scheduling in NR. While type 2 CB is typically for more accurate CSI feedback for multi-user MIMO (MU-MIMO) scheduling.

For both type 1 and type 2 CBs, for each rank, a precoding matrix W is defined in the form of: $W=W_1W_2$ Where $$W_1 = \begin{bmatrix} d_1 & d_2 & \ldots & d_L & 0 & 0 & \ldots & 0 \\ 0 & 0 & \ldots & 0 & d_1 & d_2 & \ldots & d_L \end{bmatrix}$$

is a 2N×2L matrix and contains information of L selected Discrete Fourier Transform (DFT) beams $\{d_i, i=1, \ldots, L\}$, where $d_i$ is a N×1 DFT vector and N is the number of CSI-RS ports per polarization; while $W_2$ is a 2L×v matrix and contains the co-phasing coefficients between the selected beams and also between antenna ports with two different polarizations, where v is the number of layers or rank. $W_1$ is the same for the whole CSI bandwidth, while $W_2$ can be for the whole bandwidth or per subband.

In case of type 1 CB, the precoding vector for each MIMO layer is associated with a single DFT beam. While for type 2 CB, the precoding vector for each layer is a linear combination of multiple DFT beams.

Enhanced Type 2 Codebook in NR

In NR Rel-16, type 2 CB in Rel-15 is enhanced by applying frequency domain (FD) DFT basis across all subbands to reduce CSI feedback overhead and/or improve CSI accuracy. Instead of reporting $W_2$ for each subband, linear combinations of DFT basis vectors are used to jointly represent $W_2$ across the whole CSI bandwidth. For each layer, a precoding matrix W across all subbands is in the form of $W = W_1 \tilde{W}_2 W_f^H$, where $W_f = [f_1, \ldots, f_M]$ is a matrix containing M selected frequency domain DFT basis vectors $\{f_1, \ldots, f_M\}$, $W_2$ is 2L×M matrix containing the coefficients for each selected DFT beam and each selected FD basis vector, and $W_1$ consists of selected L spatial domain (SD) DFT beams over two polarizations.

Quasi-Colocation (QCL) and Transmission Configuration Indicator (TCI)

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g. Doppler spread), the UE can estimate that parameter based on one of the antenna ports and apply that estimate for receiving signal on the other antenna port. Typically, the first antenna port is represented by a measurement reference signal such as TRS or Synchronization Signal Block (SSB), known as source RS, and the second antenna port is a demodulation reference signal (DMRS), known as target RS.

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS are defined:

Type A: {Doppler shift, Doppler spread, average delay, delay spread}
Type B: {Doppler shift, Doppler spread}
Type C: {average delay, Doppler shift}
Type D: {Spatial Rx parameter}

Multi-Transmission Reception Point (TRP) Transmission

Reliable Physical Downlink Shared Channel (PDSCH) and Physical Downlink Control Channel (PDCCH) transmission with multiple TRPs has been introduced respectively in NR Rel-16 and Rel-17, in which a PDSCH or PDCCH may be transmitted over multiple TRPs to improve reliability. An example is shown in FIG. 3, where TRP specific TRS and CSI-RS are transmitted from each TRP, while PDSCH and PDCCH may be repeated over different TRPs. For example, TRP1 can transmits TRS #1 and CSI-RS #1 to the UE. TRP2 can transmit TRS #2 and CSI-RS #2 to the UE. However, TRP1 and TRP2 can each transmit PDCCH and PDSCH in a repetitive way (in time).

SUMMARY

There currently exist certain challenge(s). It is observed by measurements in real deployments that downlink MU-MIMO precoding performance degrades when one or more of the co-scheduled UEs start to move faster than a few km/h. The reason is that the information of the channels, used to compute the precoding, becomes outdated rather soon when this occurs.

Thus, there is a need to make downlink MU-MIMO precoding robust to higher UE speeds.

It has been proposed and discussed in 3GPP pre-Rel.18, to extend Type-II CSI feedback with time domain/Doppler information. The problem with this approach is that Type-II CSI computation is highly complex already in the current release, including measurements of up to 32 CSI-RS ports, and adding also time domain information extraction on top of this makes the complexity for the UE even higher.

Another problem is that Type-II feedback does not extend to multi-TRP operation and Layer 1 (L1)/Layer 2 (L2) mobility, since it is introduced with a single TRP based operation in mind. Thus, there is a need to make MU-MIMO precoding across multiple TRPs more robust to UE speed while at the same time maintaining low UE complexity.

Certain aspects of the disclosure and their embodiments may provide solutions to these or other challenges.

For example, there is provided a UE, which can be configured to measure time domain information on one or more of its configured TRS. Then, CSI reporting can be based on the TRS measurement, either as a new, independent report, or as an add-on to existing CSI reports. A method in a UE for measuring and reporting CSI information to the network, related to downlink time domain channel properties where the measurements related to time domain parameters are configured by the network to the UE to be performed using a CSI-RS for tracking (e.g. a TRS) is also provided.

As an example, there is provided a method performed by a UE. The method comprises: receiving a reference signal over multiple time instances; determining time domain properties of a channel, based on the received reference signal; and sending a report to a network node, the report comprising information about the determined time domain properties of the channel. A UE configured to perform this method is also provided.

There is also provided a method performed by a network node. The method comprises: sending a reference signal over multiple time instances to a user equipment (UE); and receiving a report from the UE, the report comprising information about time domain properties of a channel, the time domain properties of the channel determined based on the transmitted reference signal. A network node configured to perform this method is also provided.

Certain embodiments may provide one or more of the following technical advantage(s).

The embodiments allow measurement and reporting of time domain information and the complexity is maintained low since TRS is a single port CSI-RS. Also, TRS is periodically transmitted and is therefore suitable for time domain measurements. With such low complexity estimation, the method can easily be extended to measurements from multiple transmission points.

In addition, since TRS is an already existing signal which the UE may perform some measurements on, the embodiments yield a minimal increase in reference signal overhead (i.e., no need to introduce additional reference signals since TRS is reused for time domain measurements) and UE complexity, while still solving the mentioned problems.

It is thus an attractive method for implementation, compared to using a full (up to 32 port) CSI-RS for time domain measurements, calculations and reporting. Such CSI-RS also consumes a lot of reference signal overhead. It shall be noted however that the embodiments also include a solution using a combination of a full CSI-RS (e.g. 32 port) with the TRS (1 port) to determine the space-time properties and the time domain properties respectively.

BRIEF DESCRIPTION OF THE DRAWINGS

Exemplary embodiments will be described in more detail with reference to the following figures, in which.

DETAILED DESCRIPTION

Some of the embodiments contemplated herein will now be described more fully with reference to the accompanying drawings. Embodiments are provided by way of example to convey the scope of the subject matter to those skilled in the art.

Measurements done on the CSI-RS provide frequency and space information of a channel in a CSI report, i.e. the UE reports a preferred MIMO precoding matrix per subband, for a given point in time. This is the current, "normal" CSI reporting.

In order to solve the problem as mentioned above regarding higher speed UEs, there is a need to have the time domain/Doppler information. To do so, TRS, instead of CSI-RS can be used and a report based on the TRS measurements can be sent to the network node. This kind of reporting is a new report type.

Figure 7:
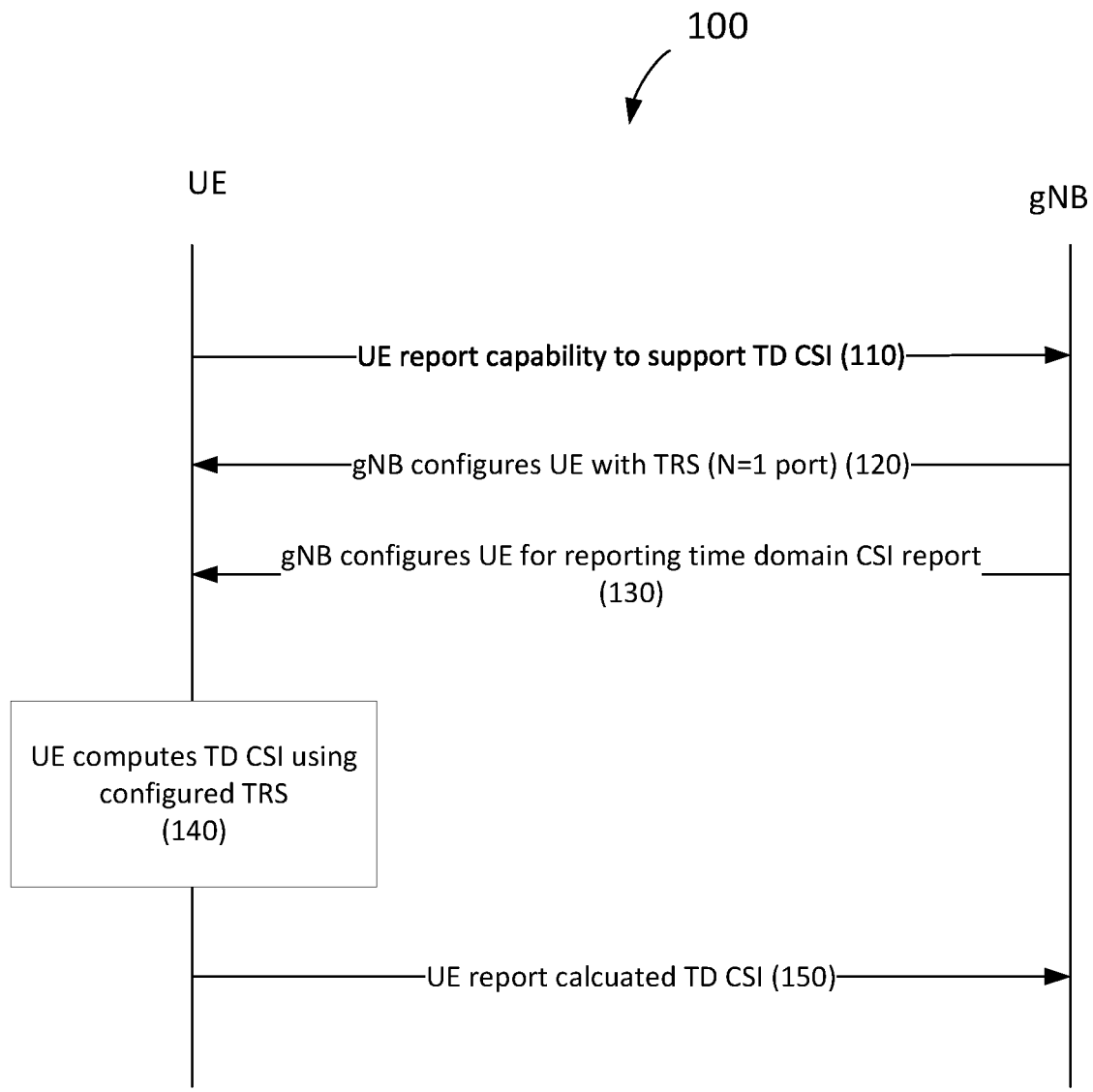
FIG. 7 illustrates a signal diagram of a method between a UE and a network node (e.g. gNB), where the UE is configured with a TRS to be used for CSI reporting of time domain (TD) channel properties, according to one embodiment.

Turning to FIG. 7, a signal diagram of a method 100 enabling a UE for measuring and reporting CSI information to the network (e.g. gNB), related to downlink time domain channel properties, will be described. For example, method 100 uses TRS measurements to derive the time-domain/Doppler information of a channel. This method allows to decouple the reporting of the new time domain/Doppler information from the legacy "normal" CSI reporting. This is useful since the normal CSI reporting is not needed, for example in Time Division Duplex (TDD) systems, e.g. the network node (e.g. gNB) can figure out the MIMO precoder from Sounding reference signal (SRS) measurements. So, configuring a normal report in this case is not useful. Furthermore, Type-II report ("normal CSI report") is very complex to compute for UEs. It should be understood that using CSI-RS for time-domain information measurements is not suitable for such measurements since each antenna port only occupies one OFMD symbol and with very low frequency density (1 sample per 12 subcarriers). For CSI-RS, it is not supported to pick a subset of ports for doppler estimation and reporting. In case a dedicated CSI-RS resource for a small number of ports is supported, the supported CSI-RS RE pattern may not be good enough. For example, for 1/2/4 ports, only one symbol is used.

Even if multiple resources separated in time (e.g. 2 single-port resources in two symbols) are configured, the current 3GPP specification does not support to aggregate the resources and perform channel/doppler measurement and reporting.

Method 100 of FIG. 7 uses TRS for measurement for the new report. It has been observed that the complexity is very low for such measurements, since TRS is a 1 port CSI-RS. Performance is also good since it is a periodic signal, suitable for this kind of time domain parameter estimation. Indeed, TRS is spread out over times (4 OFDM symbols in two slots in each period and over multiple periods) which makes it suitable for time domain parameter estimation (e.g. time correlation). This means that the reference signal (e.g. TRS) spans or is spread over multiple time instances. Moreover, the UE is already configured with a TRS for other purposes, so it can be reused for this purpose. Method 100 comprises:

Step 110 in which the UE can report its capability to support Time Domain (TD) CSI to a network node. This step may be optional;

Step 120 in which the network node (e.g. gNB) configures the UE with TRS, with N=1 port, for example;

Step 130 in which the network node further configures the UE for reporting TD CSI report;

Step 140 in which the UE calculates/computes/determines/measures the TD channel state information, using the configured (or received) TRS; and Step 150 in which the UE sends a report to the gNB, the report comprising the TD CSI information.

In some examples, the time domain channel properties related to the downlink channel can be time correlation, Doppler shift, Doppler spread, level crossing rate, etc.

It should be noted that in step 140 "configured TRS" means that the UE receives a TRS as configured by the network node. In this case, a configured TRS is interchangeable with a received TRS.

In step 120, the UE is configured with TRS, which can be given by a CSI-RS for tracking (a NZP CSI-RS resource set with parameter 'trs-Info'), configured to the UE.

Note that the current NR UE can be configured with two NZP CSI-RS, one for channel measurements and one for interference measurements to compute the CSI report. Therefore, the embodiments herein allow the network node to configure the UE with a CSI report configuration including a third NZP CSI-RS, used for reporting time domain channel property, where this third NZP CSI-RS is a TRS, it may even be the same TRS configured to the UE for synchronization and frequency offset estimation.

This configuration (of the TRS) can be done by adding a new row, e.g., nzp-CSI-RS-ResourcesForTimeDomain, in the CSI-ReportConfig IE in 3GPP TS 38.331:

In step 130, in one embodiment, a stand-alone CSI report can be introduced (e.g. "reportQuantity='timedomain'"), which only contains information based on measurements on the configured TRS. In this case, a TRS may be directly configured as a measurement for CSI measurements as a single port CSI-RS resource. For this report, the report quantity does not contain PMI, Layer Indicator (LI), index 1 (i1) or RI, although it may contain CRI, CQI, and CRI-Reference Signal Received Power (RSRP). The UE is thus only configured with one or multiple TRS in this embodiment and can therefore only use TRS for the time domain property report.

In another embodiment, one or multiple TRS resources (each may be associated with one TRP) are configured to the UE for tracking time domain channel property/Doppler information (step 120). The gNB may configure one CSI-ReportConfig associated with multiple TRS resources or multiple CSI-ReportConfigs each associated with one of the configured TRS resources. Within each CSI report, the UE reports information of measured time domain properties associated with the one or multiple TRS resources each indicated via a TRS resource indicator (in TCI). A new report quantity can be introduced for this, e.g., reportQuantity=cri-timedomain.

Additional methods (see FIGS. 8 and 9) are also provided. In these methods, the UE is configured with a normal CSI report (e.g. Type 2 CSI report) but the UE is also configured/instructed to measure time domain related information on an 1 port TRS, in order to reduce UE complexity. The normal CSI-RS may be 16 or 32 ports for massive MIMO and is typically aperiodically triggered (single slot in a few adjacent OFDM symbols). Thus, the CSI-RS is not a periodic signal, and therefore it is hard/not suitable to be used for time domain parameter estimation. As such, the embodiments in methods of FIGS. 8 and 9 use a combination of the (32 port) CSI-RS (which may be aperiodic) for space/frequency information and a 1 port TRS (which is periodic) for time information. It could be however that for this case, 3GPP doesn't specify how UEs perform measurements of the time domain properties for the methods of FIGS. 8 and 9.

```
CSI-ReportConfig ::=            SEQUENCE {
    reportConfigId              CSI-ReportConfigId,
    carrier                     ServCellIndex              OPTIONAL, -- Need S
    resourcesForChannelMeasurement   CSI-ResourceConfigId,
    csi-IM-ResourcesForInterference  CSI-ResourceConfigId       OPTIONAL, -- Need R
        nzp-CSI-RS-ResourcesForInterference   CSI-ResourceConfigId   OPTIONAL, -- Need R
        nzp-CSI-RS-ResourcesForTimeDomain     CSI-ResourceConfigId   OPTIONAL,
    ... (unchanged text)......
```

Note that the network node may configure only the third, or two of them or all three of them for measurements, given a certain CSI report type. In this step (120), the nzp-CSI-RS-ResourcesForTimeDomain is also a possible RS for measurements for the CSI report, which is targeting time domain channel properties.

The UE may be also configured with an SS/PBCH that is associated with the TRS (using CQL configuration) and may in this case also (or alternatively) use the SS/PBCH for such time domain measurements.

The NR UE may also be configured with an LTE CRS in which case the LTE CRS can be used to measure channel time domain properties.

In the following description, TRS will be used but it shall be understood that a configured SS/PBCH or LTE CRS, may also or alternatively be used.

Therefore, if the UE is configured with aperiodic CSI-RS for an aperiodic CSI report, then it can also use a configured periodic TRS for the estimation of/reporting of time domain related parameter in the CSI report.

Figure 8:
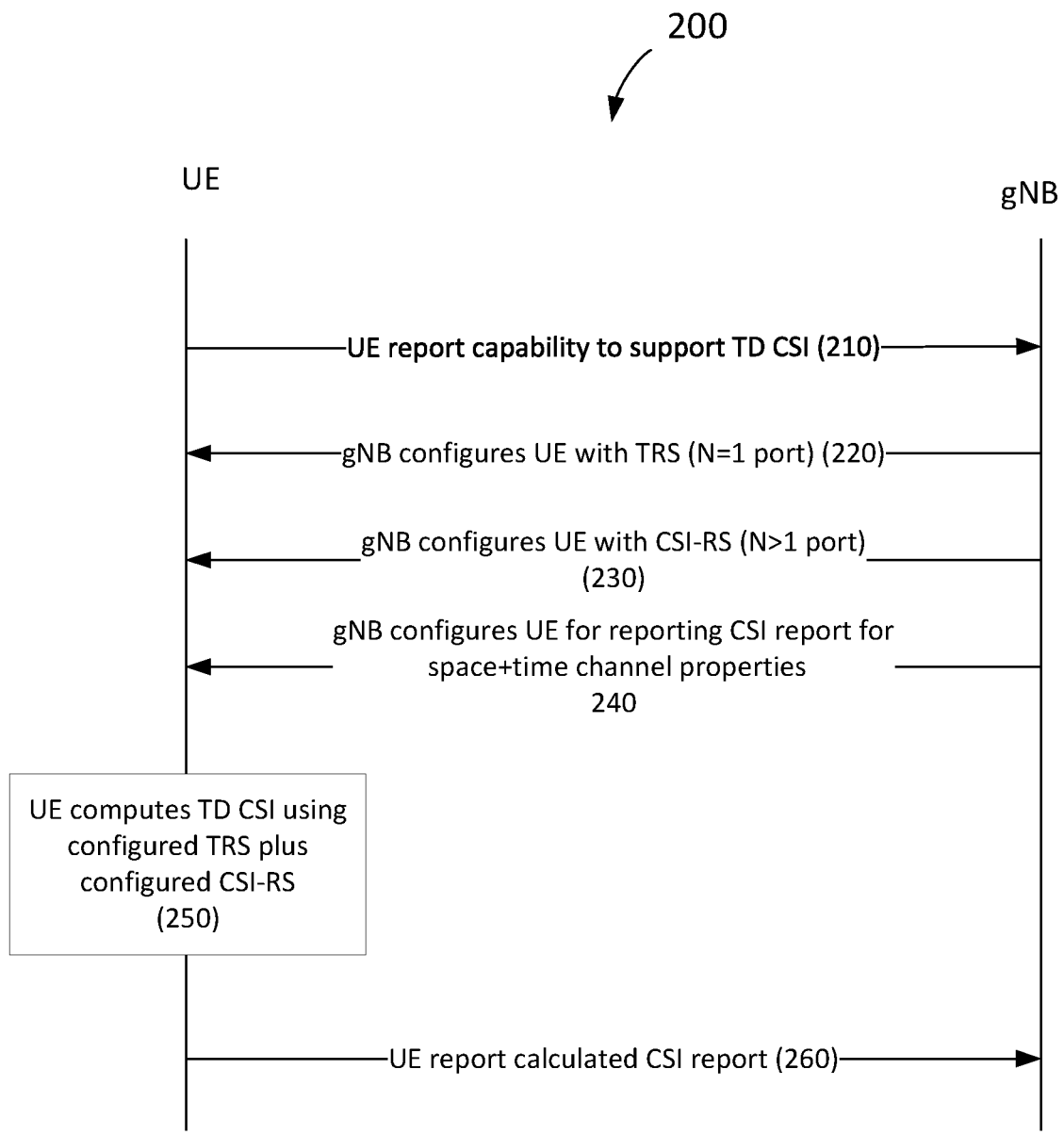
FIG. 8 illustrates a signal diagram of a method between a UE and a network node (e.g. gNB), where the UE is configured with a TRS and a CSI-RS with multiple ports, to be used for CSI reporting of TD channel properties as well as spatial/frequency domain properties. This can for example be a Type-II CSI report that is extended to also include time domain channel properties, according to one embodiment.

FIG. 8 illustrates such a scenario with method 200, which configures the UE with CSI-RS and TRS. More specifically, method 200 comprises:

Step 210 in which the UE can report its capability to support Time Domain (TD) CSI to a network node. This step may be optional;

Step 220 in which the network node (e.g. gNB) configures the UE with TRS, with N=1 port, for example;

Step 230 in which the network node (e.g. gNB) configures the UE with CSI-RS, with N>1 ports, for example;

Step 240 in which the network node further configures the UE for reporting CSI report for space/frequency and time channel properties.

Step 250: the UE calculates/computes/determines/measures the CSI (frequency/space and time properties), using the configured TRS and the configured CSI-RS.

Step 260: the UE sends a report to the gNB, the report comprising the calculated CSI information (frequency/space and time properties).

For example, in steps 230 and 240, the UE is configured with a first CSI-RS for channel measurements (e.g. resourcesForChannelMeasurement in the RRC signalling) and CSI reporting related to spatial and/or frequency domain properties of the channel (typically with N>1 CSI-RS ports), which can be used for MIMO precoding and link adaptation, or for beam management and CSI reporting. For example, the CSI Type-II report available in NR Rel-15 and extended in Rel-16 and 17 can be used for this report, or the basis for a Rel-18 extension of this report. The UE is also configured with a second CSI-RS configured as a TRS (e,g, nzp-CSI-RS-ResourcesForTimeDomain in the RRC configuration, using N=1 CSI-RS port) in step 220. Hence, the UE uses the second CSI-RS for assisting estimation of time domain channel properties while using the first CSI-RS for spatial MIMO parameters (and possible frequency domain parameters) for the CSI report (e.g. rank, PMI, i1, subband PMI, etc.).

Figure 9:
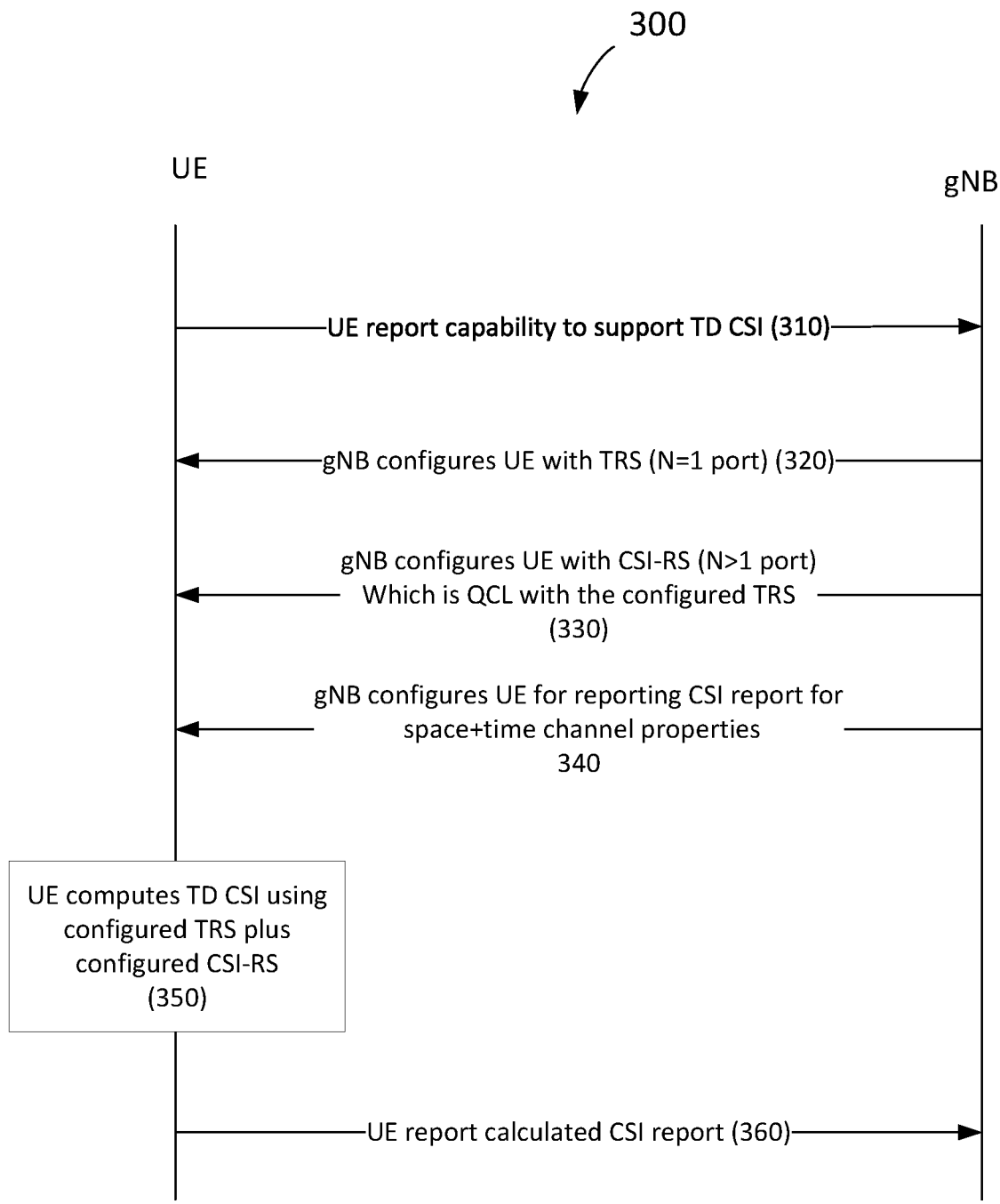
FIG. 9 illustrates a signal diagram of a method between a UE and a network node (e.g. gNB), which is an extension to FIG. 8, where the configured TRS is configured as the QCL source for the CSI-RS with multiple ports, according to one embodiment.

Further, the first CSI-RS may be configured as QCL with the second CSI-RS by using a TCI state, i.e. the TCI state configuration used for the first CSI-RS contains a periodic NZP CSI-RS configured for tracking (i.e. a TRS). Hence, in this case, both the NZP CSI-RS and the TRS are used to compute the CSI report, where the measurements on TRS directly impacts the reported quantity. This case is illustrated in FIG. 9, where method 300 is similar to method 200, except for step 330, in which the gNB configures the UE with CSI-RS (N>1 port) which is QCL with the configured TRS.

When reporting the CSI, the associated TRS is configured by the network to be used by the UE to at least partly determine the channel time domain properties, for the new type of CSI report. Alternatively, the TRS is not part of the TCI state but instead, configured as an additional NZP CSI-RS resource for CSI reporting measurements, in which case the UE performs the time domain related channel measurements on that TRS.

The CSI report may, in addition to time domain information, include legacy CSI reporting parameters such as PMI, RI.

The CSI report may include time domain information implicitly, where the legacy CSI reporting parameters such as PMI, RI are determined by the UE assuming a prediction into the future, i.e. with a CSI reference resource that is defined at a time later than the time for the report.

The CSI report may be based on, as an extension to, a Type-I CSI report, or based on/an extension to a 'Type-II CSI report.

In step 320, the UE is configured, using higher layer signalling, with a CSI resource setting a NZP CSI-RS resource with parameter 'trs-Info' used for time domain channel measurements, when the higher layer parameter reportQuantity contains an indication that the CSI report should contain the new time domain information not present in NR Rel-17 or earlier.

In some examples, the new type of report based on TRS contains information of the carrier frequency offset (CFO), which can be utilized by the gNB, for example, to compensate inter symbol interference. The CFO can be considered reciprocal given that the same local oscillator is used for both transmission and reception at a network node.

The time domain channel properties may also include one or more of the following (for methods 100, 200 and 300):

auto-correlation function of the channel, i.e., $R_{i,j}(\tau)=E[h_{i,j}(t)h_{i,j}^*(t-\tau)]$, where $h_{i,j}(\tau)$ is the channel between the $i^{th}$ Transmit (Tx) antenna port at the gNB and the $j^{th}$ Receive (Rx) antenna port at the UE at time t; $\tau$ is the time delay; $(\cdot)^*$ denote complex conjugate, for TRS, j=0, i.e. a single port is used;

an averaged version of the auto-correlation function over all Tx and Rx ports, $\overline{R}(\tau)$, where for TRS, a single TX port is used;

auto-correlation function of $W_2$ in type 1 codebook, i.e., $R_{w_2(k,l)}(\tau)$, where $W_2(k, l)$ is the $(k,l)^{th}$ element of $W_2$;

the maximum Doppler frequency, $f_{d,max}$;

Doppler frequency spread, i.e., the Fourier transform of $R_{i,j}(\tau)$, $\overline{R}(T)$, or $R_{w_2(k,l)}(\tau)$;

The level crossing rate of the channel measured on the TRS.

The time domain channel properties may be reported for the whole configured CSI band or for each subband.

Note that in some examples, a quantized or compressed version of the time domain channel properties may be reported, e.g., using basis function expansions. An example of a basis function is the discrete Fourier transform basis.

In one embodiment, the UE is configured to report time domain channel properties for multiple TRS resources. The gNB can way, the gNB can obtain richer channel information which can be useful for, e.g., scheduling, link adaptation, channel estimation and PMI prediction.

Figure 1:
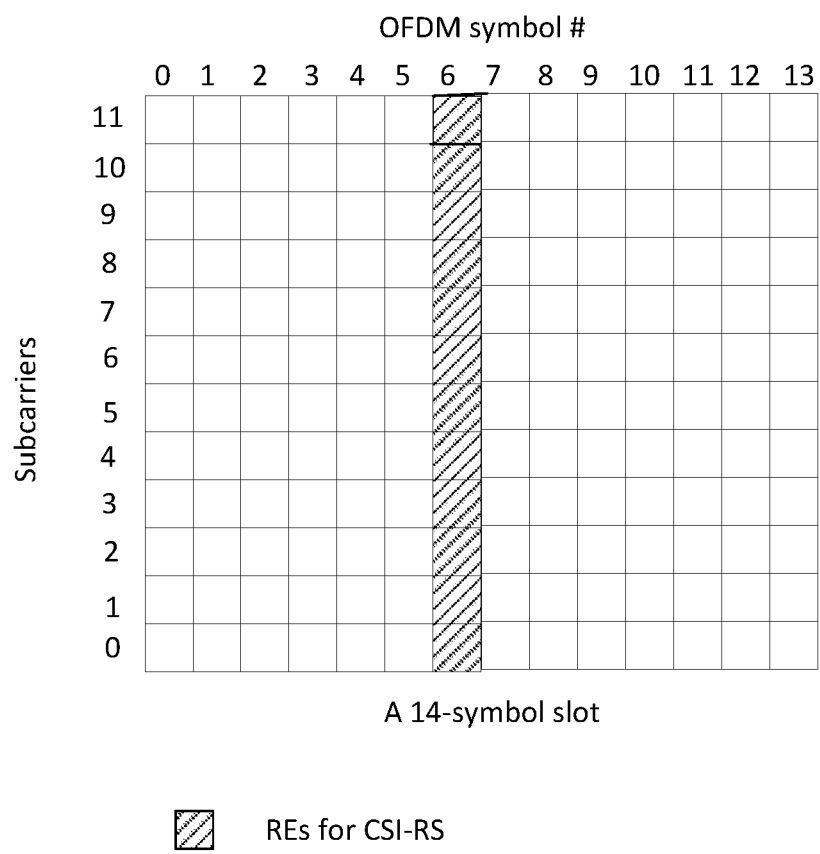
FIG. 1 illustrates an example of RE allocation for a 12-port CSI-RS in NR.
Figure 2:
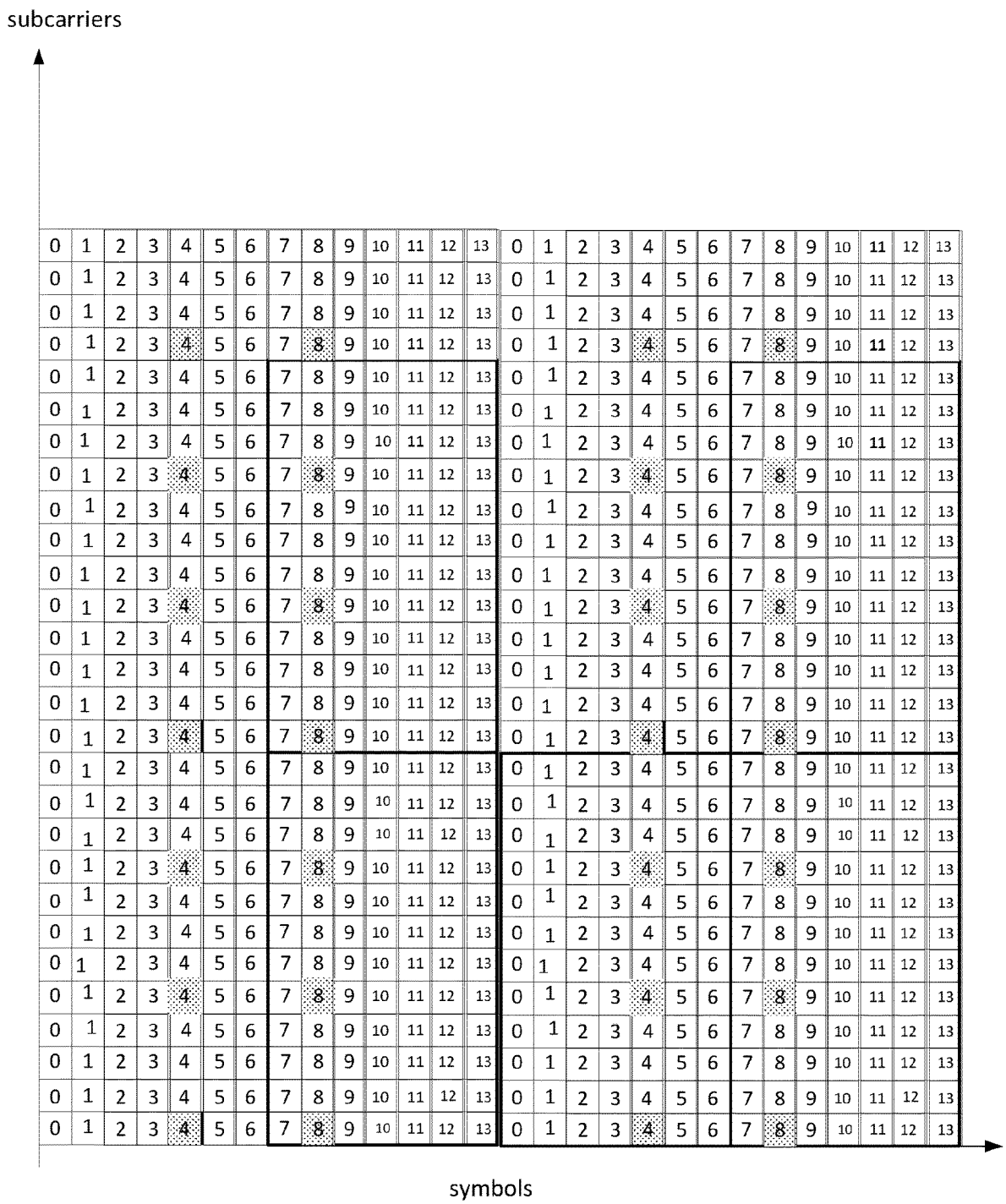
FIG. 2 illustrates an example of RE allocation for a TRS burst with 2 TRS symbols in 2 adjacent slots.
Figure 3:
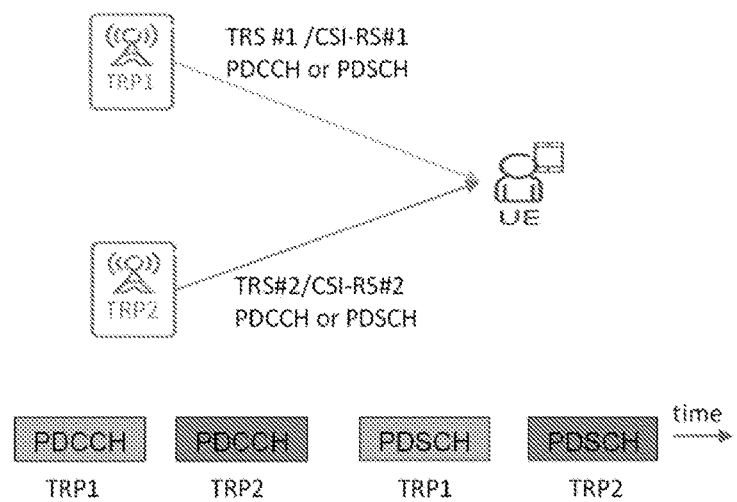
FIG. 3 illustrates an example of PDCCH/PDSCH transmission from multiple TRPs for increasing reliability.
Figure 4:
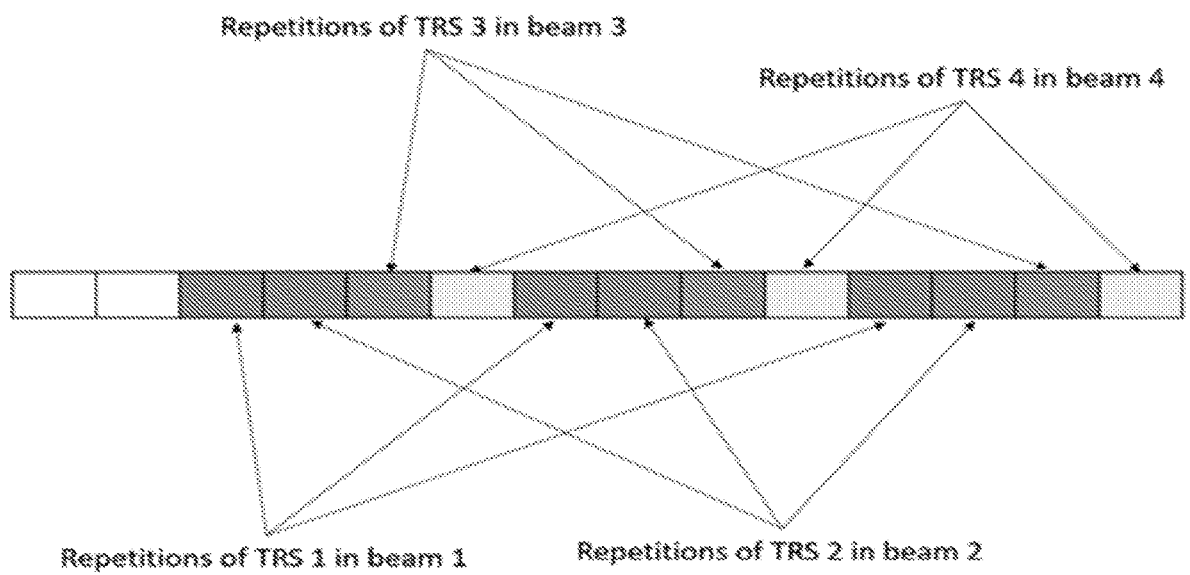
FIG. 4 illustrates an example showing 4 TRSs transmitted in 4 different spatial directions (i.e., beams) within a slot, each TRS is repeated 3 times.

In another embodiment, the multiple TRS resources used for obtaining the time domain channel properties are configured in the same NZP CSI-RS resource set, where each of the multiple TRS resources is repeated a given number of times within a slot. The given number of times each TRS resource is repeated is configurable to the UE, for example. In some other examples, the number of times each TRS resource is repeated is fixed in 3GPP specifications. FIG. 4 shows an example where 4 TRS resources are configured within the same NZP CSI-RS resource set. Each of the 4 TRS resources are repeated 3 times. For each TRS, the UE uses the repetitions of that TRS to measure the time domain channel properties. Although the repetitions are shown to be uniformly spaced in the example of FIG. 4, the example is non-limiting in the sense that the repetitions can be non-uniformly spaced.

Figure 5:
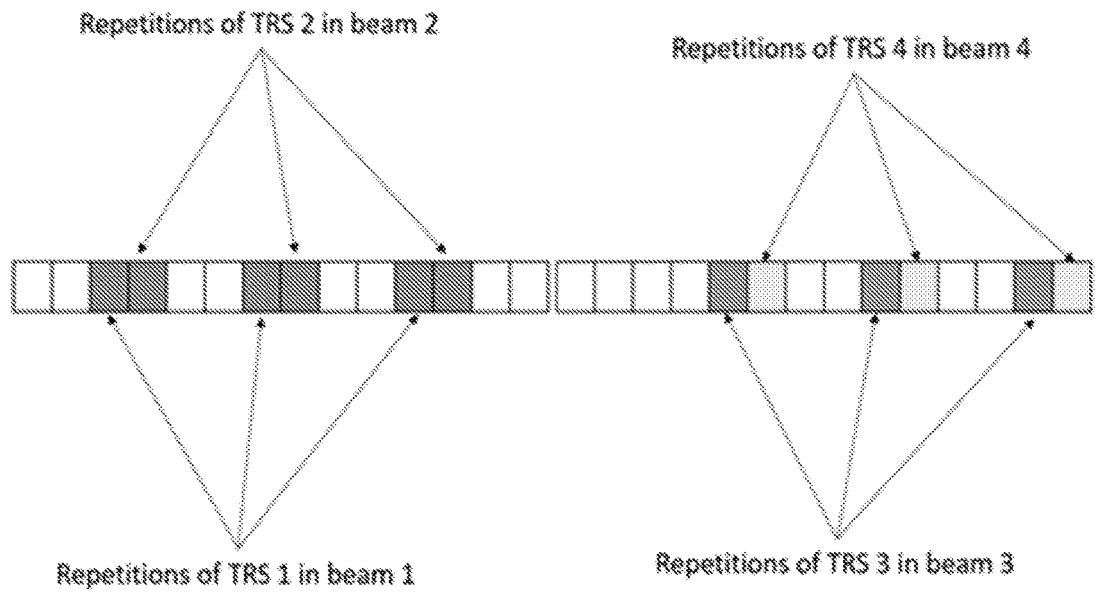
FIG. 5 illustrates an example showing 4 TRSs transmitted in 4 different spatial directions (i.e., beams) over two different slots, each TRS is repeated 3 times.

Furthermore, in some embodiments, the TRS resources may be configured in different NZP CSI-RS resource sets as shown in FIG. 5. For instance, in FIG. 5, TRS resources 1 and 2 (denoted as TRS 1 and TRS 2) may be configured as part of one NZP CSI-RS resource set, and TRS resources 3 and 4 (denoted as TRS 3 and TRS 4 in the figure) may be configured as part of another NZP CSI-RS resource set. Each TRS may be repeated as shown in FIG. 5.

Figure 6:
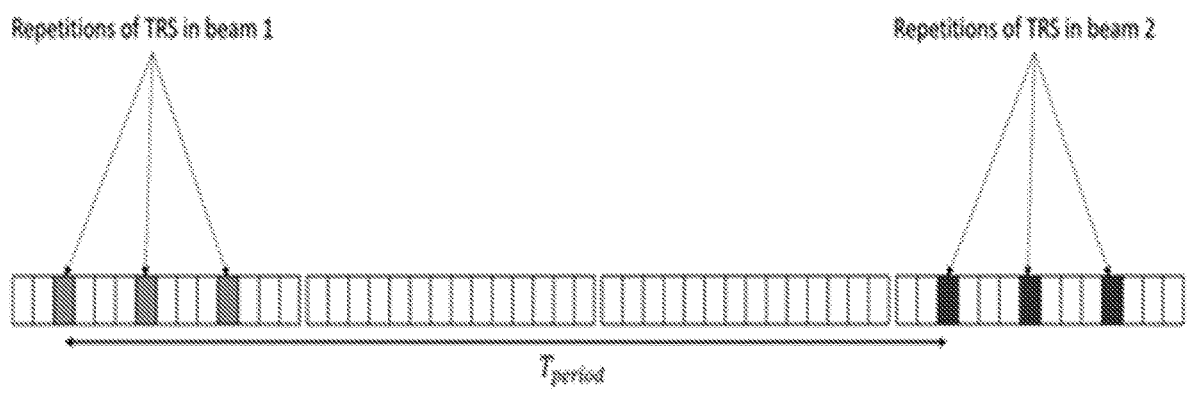
FIG. 6 illustrates an example showing time domain measurement restriction for measuring time domain channel properties using different spatial directions on a TRS resource.

As illustrated in steps 130, 240 and 240, the UE is configured to report time domain channel properties in a CSI reporting configuration where the time domain channel properties are derived from measurements on a configured TRS resource. A higher layer parameter is configured in the CSI reporting configuration to enable time domain restriction for performing these measurements on the configured TRS resource. In one example, as shown in FIG. 6, the UE is restricted to perform time domain channel property measurements within one period $T_{period}$ of the TRS resource. That is, the UE performs the time domain channel property measurements using the repetitions of the TRS resource within one period $T_{period}$. The benefit of this case is that different spatial directions (or beams) can be used by the network every period $T_{period}$, so that the UE can measure and report time domain channel information corresponding to different spatial directions (or beams) every period $T_{period}$. Although the example shows the UE being restricted to perform time domain channel property measurements within one period $T_{period}$, in another example, the UE can be restricted to perform time domain channel property measurements every N periods (i.e., over a duration of N×$T_{period}$) where N>1. This example is beneficial since time domain channel information corresponding to different spatial directions (or beams) can be obtained using a single TRS resource (or a few TRS resources).

The TRS for time domain channel property measurement can be periodic or aperiodic. The CSI report containing information about the measured time domain channel properties can be periodic, semi-persistent, or aperiodic. In one embodiment, the TRS is configured as CSI resources for channel measurement (i.e., higher layer parameter "resourcesForChannelMeasurement") in an existing CSI report setting (i.e., with corresponding higher layer parameter CSI-ReportConfig). In this case, "csi-IM-Resources-ForInterference" and "nzp-CSI-RS-ResourcesForInterference" may not be configured in the "CSI-ReportConfig". A new report "reportQuantity" may be introduced to indicate CSI reporting of time domain channel properties.

In another example, CSI-RS other than TRS may be used for time domain channel property measurement. The CSI-RS for the purpose may be a single CSI-RS resource repeated in multiple OFDM symbols within a slot or across multiple slots. The repetitions may be uniformly spaced in time or non-uniform spaced. In another embodiment, multiple CSI-RS resources having the same number of CSI-RS ports and allocated in different time instances (e.g., different OFDM symbols in a slot or in different slots) may be configured. In this case, the different CSI-RS resources are associated with the same CSI-RS ports, i.e., the different CSI-RS resources are transmitted from the same set of CSI-RS ports at different times.

The time domain properties, such as the maximum Doppler frequency and/or Doppler frequency spread (i.e., Doppler spectrum), time domain auto-correlations, may be explicitly reported. The parameters may be quantized before been reported. For example, the Doppler frequency may be divided into different ranges, e.g., fd<100 Hz, 100<=fd<200 Hz, and so on. The Doppler frequency may also be reported relative to the carrier frequency f0, i.e., fd/f0. In another embodiment, the time domain properties may be implicitly reported.

Figure 10:
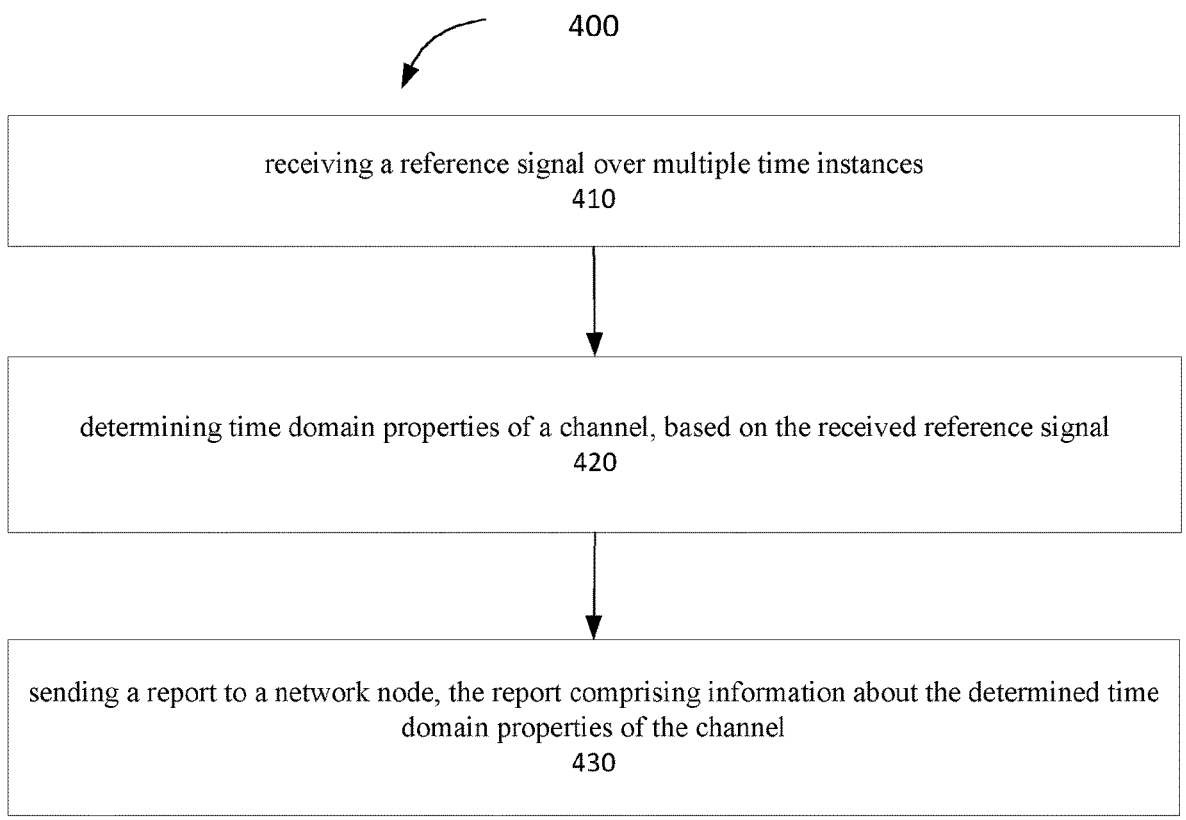
FIG. 10 illustrates a flow chart of a method in a UE, according to one embodiment.

FIG. 10 illustrates a flow chart of a method 400 at the UE, for measuring and reporting time domain properties of a channel, for example. The UE can be the UE 1300 of FIG. 13. Method 400 comprises:
  Step 410: receiving a reference signal over multiple time instances;
  Step 420: determining time domain properties of a channel, based on the received reference signal;
  Step 430: sending a report to a network node, the report comprising information about the determined time domain properties of the channel.

In some examples, the time domain properties of the channel represent channel variations over time (e.g. due to UE mobility).

In some examples, the UE can receive a configuration of the reference signal.

In some examples, the UE may receive a configuration for the report, where the configuration is a CSI report configuration comprising an indication of the reference signal and an indication of reporting the time domain properties.

In some examples, the indication of reporting the time domain properties can be a configuration of a reporting quantity indicating the time domain properties to be reported.

In some examples, the CSI reporting configuration is a standalone CSI report which only contains configuration of time domain properties to be reported and does not contain other CSI reporting quantities (such as PMI, LI, or RI).

In some examples, the UE can send the report to the network node based on the configuration for the report. In some examples, the UE can send capability information to the network node, the capability information related to supporting estimation of time domain properties.

In some examples, the information about the determined time domain properties of the channel may comprise one or more of: an auto-correlation function of the channel, a maximum Doppler frequency, a Doppler frequency spread, a level of crossing rate of the channel.

In some examples, the UE can send the report, which can be for a configured band or for each subband. In some examples, the information about the determined time domain properties of the channel can comprise a quantized or compressed version of one or more of an auto-correlation function, a maximum Doppler frequency, a Doppler frequency spread, and a level of crossing rate of the channel. In some examples, the multiple time instances can be within a slot, over different slots, or both within a slot and across different slots.

In some examples, when the reference signal is periodic or semi-persistent, determining the time domain properties can be performed over one time period or over a duration of a plurality of periods of the reference signal.

In some examples, the reference signal can be a TRS. For example, the TRS can be a (special) CSI-Reference Signal (RS) for tracking (e.g. a Non Zero Power (NZP) CSI-RS). The reference signal can be also a SS/PBCH block, or a LTE-CRS.

In some examples, the UE can receive a configuration of CSI-RS from the network node. In some examples, the CSI-RS can be quasi-colocated (QCL) with the TRS.

In some examples, the UE can determine frequency and space properties of the channel, based on the configured CSI-RS. In some examples, the UE can report the determined frequency and space properties of the channel to the network node, together with the information about the determined time domain properties of the channel in the same report. The report of the frequency and space properties of the channel can be sent in a different report alternatively.

In some examples, the UE may receive a plurality of references signals over multiple time instances, from different directions. In that case, the UE may determine the time domain properties of the channel corresponding to different spatial directions.

In some examples the reference signal can have one antenna port. In some examples, the report may be different from a current (normal) CSI-RS report.

Other examples and details regarding this method have been described with references to FIG. 7 to 9.

Figure 11:
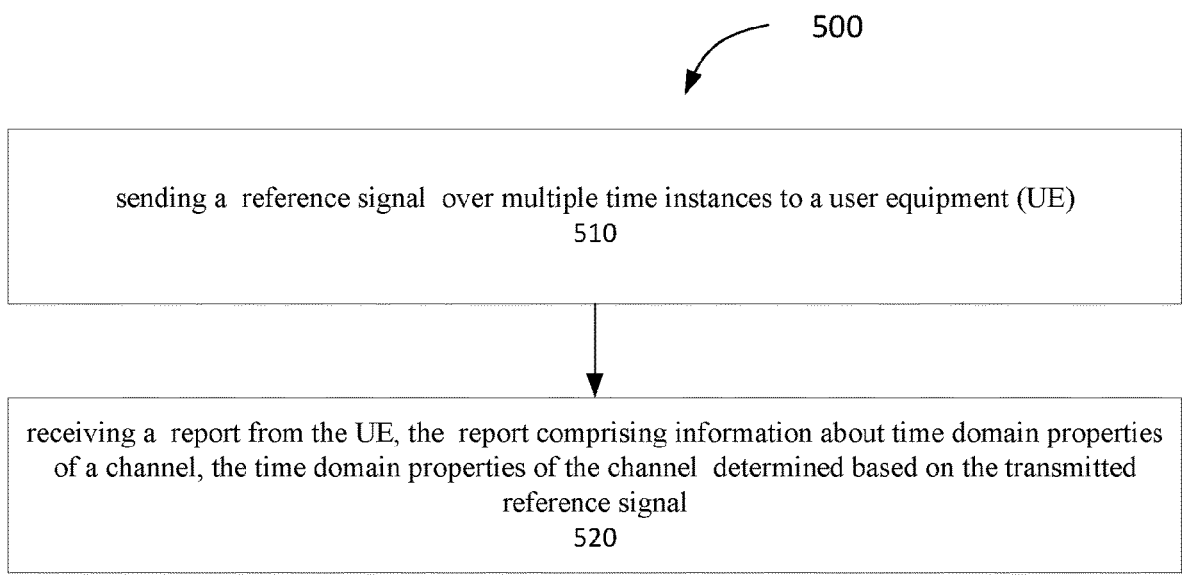
FIG. 11 illustrates a flow chart of a method in a network node, according to one embodiment.

Now turning to FIG. 11, a flow chart of a method 500 in a network node for obtaining time domain properties of a channel will be described. The network node can be the network node 1400 of FIG. 14. Method 500 comprises:

Step 510: sending a reference signal over multiple time instances to a user a UE; and Step 520: receiving a report from the UE, the report comprising information about time domain properties of a channel, the time domain properties determined based on the transmitted reference signal.

In some examples, the time domain properties of the channel can represent channel variations over time due to ULE mobility.

In some examples, the network node may transmit a configuration of the reference signal to the UE.

In some examples, the network node can send a configuration for the report, the configuration being a CSI report configuration comprising an indication of the reference signal and an indication of reporting the time domain properties.

In some examples, the indication of reporting the time domain properties can be a configuration of a reporting quantity indicating the time domain properties to be reported.

In some examples, the CSI reporting configuration can be a standalone CSI report which only contains configuration of time domain properties to be reported and does not contain other CSI reporting quantities. In some examples, the report from the UE can be received/reported, based on the configuration for the report.

In some examples, the network node can further receive capability information from the UE, the capability information related to supporting estimation of time domain properties.

In some examples, the information about the determined time domain properties of the channel can comprise one or more of: an auto-correlation function of the channel, an averaged version of the auto-correlation function, a maximum Doppler frequency, a Doppler frequency spread, a level of crossing rate of the channel.

In some examples, the network node can receive the report for a configured band or for each subband. In some examples, the information about the determined time domain properties of the channel comprises a quantized or compressed version of one or more of an auto-correlation function, a maximum Doppler frequency, a Doppler frequency spread, and a level of crossing rate of the channel.

In some examples, the multiple time instances can be within a slot, over different slots, or both within a slot and across different slots.

In some examples, when the reference signal is periodic or semi-persistent, determining the time domain properties can be performed over one time period or over a duration of a plurality of periods of the reference signal.

In some examples, the reference signal can be a TRS, which can a CSI-Reference Signal (RS) for tracking (e.g. a Non Zero Power (NZP) CSI-RS), for example. The reference signal can be also a SS/PBCH block or a LTE-CRS.

In some examples, the network node can send a configuration of CSI-RS to the UE. In some examples, the CSI-RS can be quasi-colocated (QCL) with the TRS.

In some examples, the network node can receive information of frequency and space properties of the channel determined based on the CSI-RS configuration. The information of the determined frequency and space properties of the channel can be received together with the information about the determined time domain properties of the channel in a same report, or it can be received separately, in another report.

In some examples, the network node may transmit a plurality of references signals over multiple time instances, from different directions. In that case, the report may comprise information about the time domain properties of the channel corresponding to different spatial directions.

In some examples, the reference signal has one antenna port. In some examples, the report can be different from a current (normal) CSI-RS report.

Other examples and details regarding this method have been described with references to FIG. 7 to 9.

Figure 12:
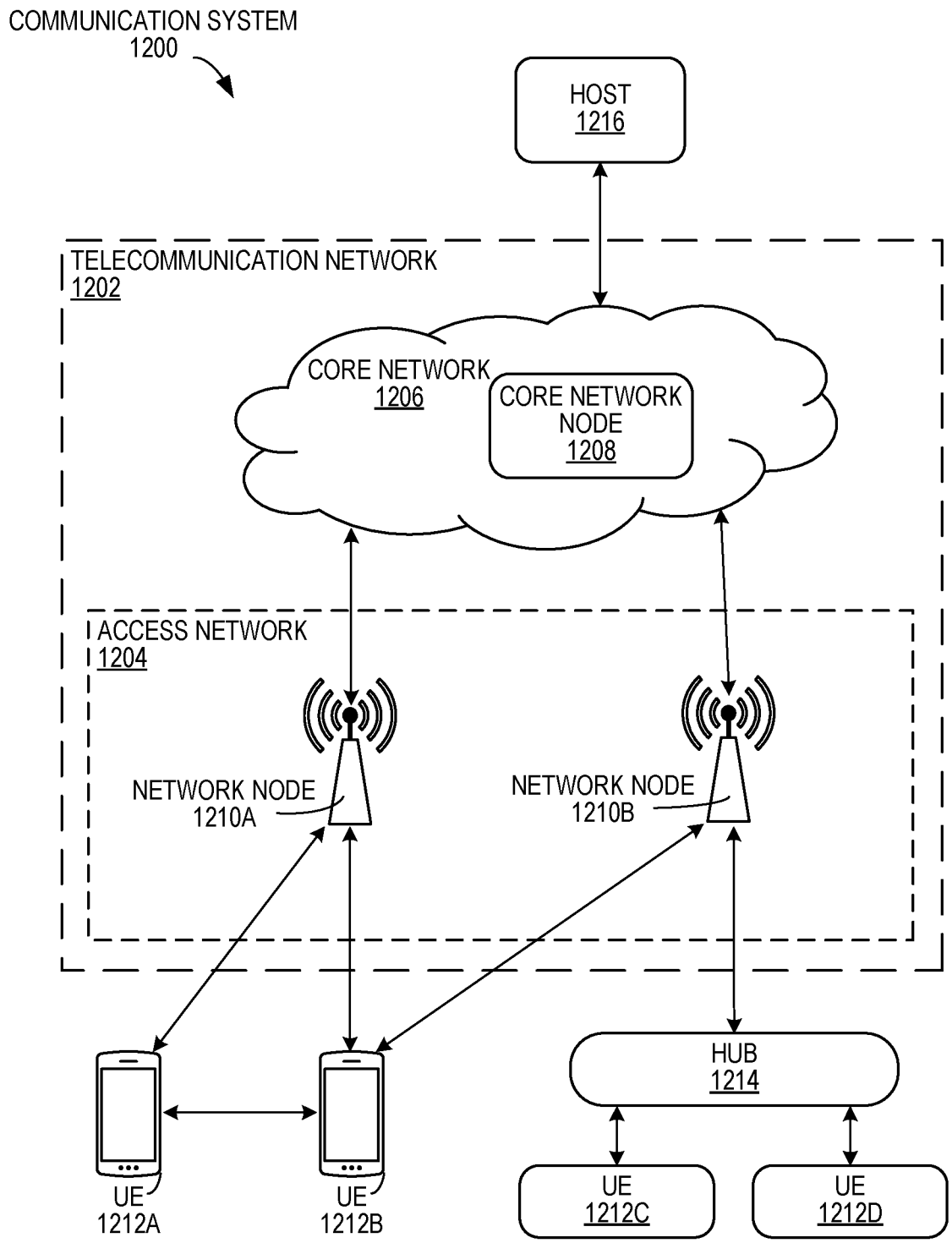
FIG. 12 shows an example of a communication system, according to an embodiment.

FIG. 12 shows an example of a communication system 1200 in accordance with some embodiments.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210a and 1210b (one or more of which may be generally referred to as network nodes 1210), or any other similar 3GPP access node or non-3GPP access point. The network nodes 1210 facilitate direct or indirect connection of UE, such as by connecting UEs 1212a, 1212b, 1212c, and 1212d (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212c and/or 1212d) and network nodes (e.g., network node 1210b). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210b. The hub 1214 may also allow for a different communication scheme and/or schedule between the hub 1214 and UEs (e.g., UE 1212c and/or 1212d), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210b. In other embodiments, the hub 1214 may be a non-dedicated hub—that is, a device which is capable of operating to route communications between the UEs and network node 1210b, but which is additionally capable of operating as a communication start and/or end point for certain data channels.

Figure 13:
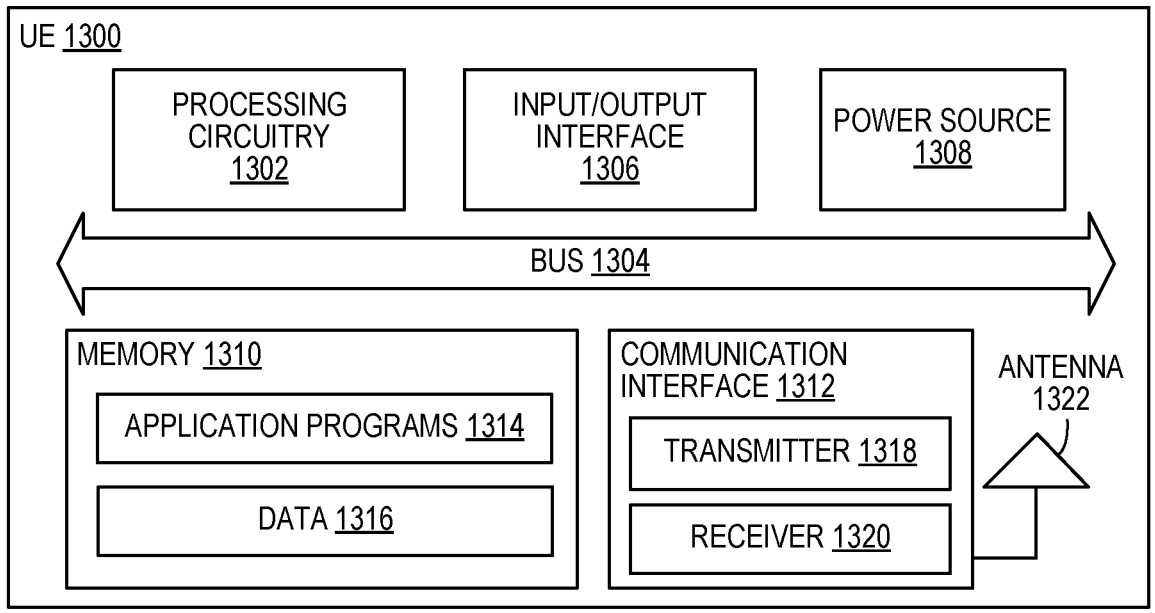
FIG. 13 shows a schematic diagram of a UE, according to an embodiment.

FIG. 13 shows a UE 1300 in accordance with some embodiments. As used herein, a UE refers to a device capable, configured, arranged and/or operable to communicate wirelessly with network nodes and/or other UEs. Examples of a UE include, but are not limited to, a smart/mobile/cell/voice over IP (VoIP)/wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 13. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs). For example, the processing circuitry 1302 is configured to perform any steps of method 400 of FIG. 10.

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable ROM (PROM), erasable PROM (EPROM), electrically EPROM (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, NR, UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1300 shown in FIG. 13.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 14:
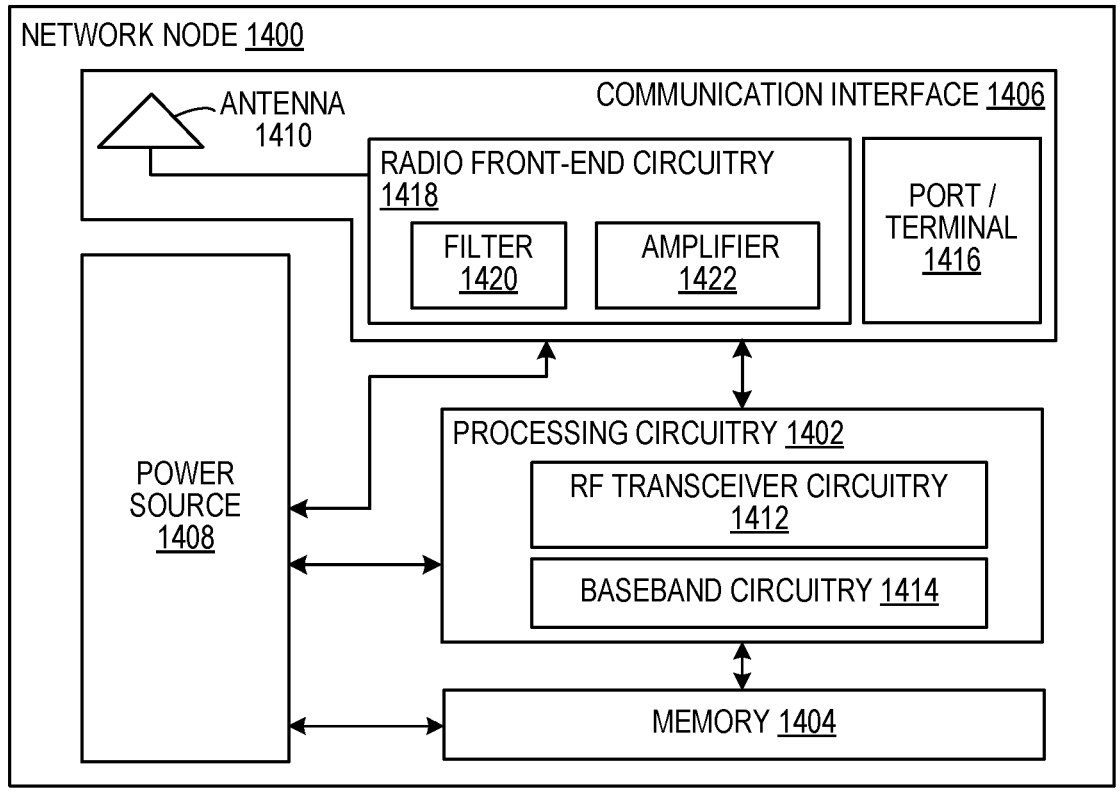
FIG. 14 shows a schematic diagram of a network node, according to an embodiment.

FIG. 14 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NodeB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NBs. In such a scenario, each unique NB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality. The processing circuitry 1402 is configured to perform any steps of method 500 of FIG. 11.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, RAM, ROM, mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 14 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 15:
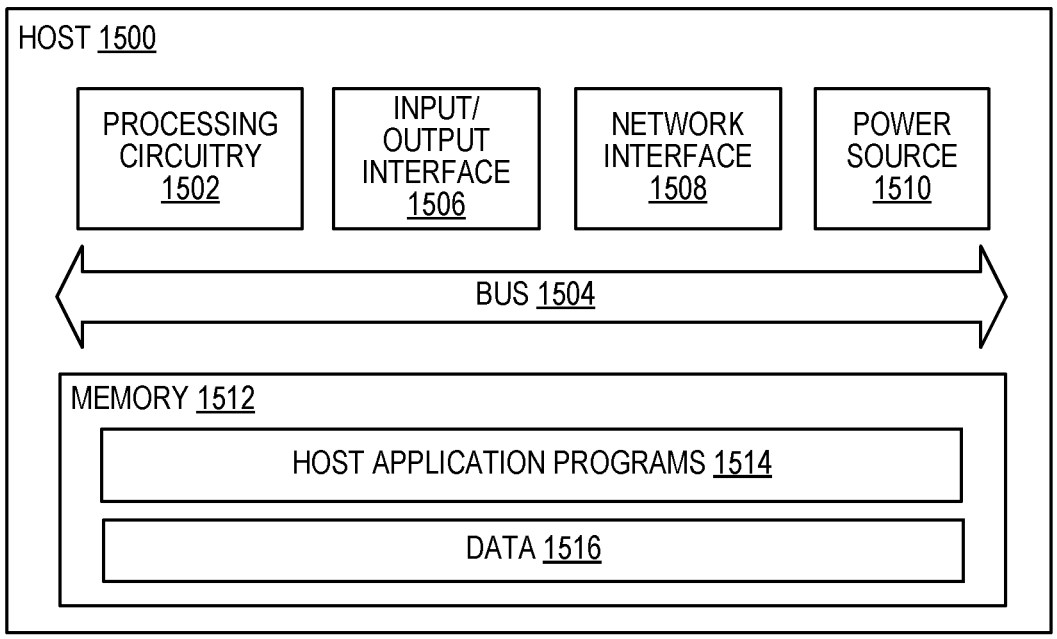
FIG. 15 illustrates a block diagram of a host.

FIG. 15 is a block diagram of a host 1500, which may be an embodiment of the host 1216 of FIG. 12, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 13 and 14, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 16:
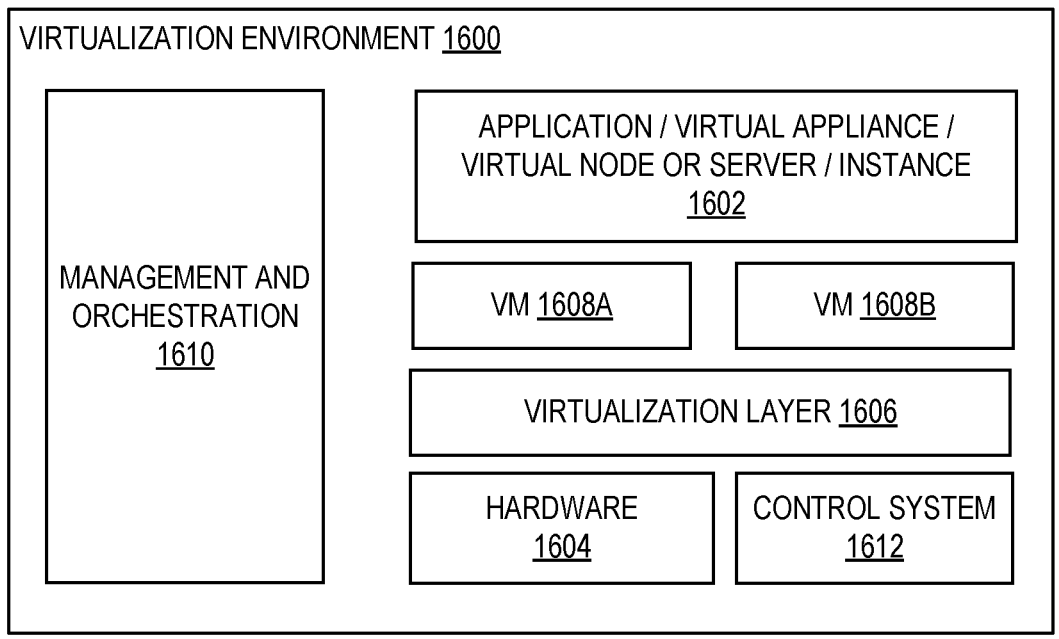
FIG. 16 illustrates a block diagram illustrating a virtualization environment.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs 1608a and 1608b (one or more of which may be generally referred to as VMs 1608), and/or perform any of the functions, features and/or benefits described in relation with some embodiments described herein. The virtualization layer 1606 may present a virtual operating platform that appears like networking hardware to the VMs 1608.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 17:
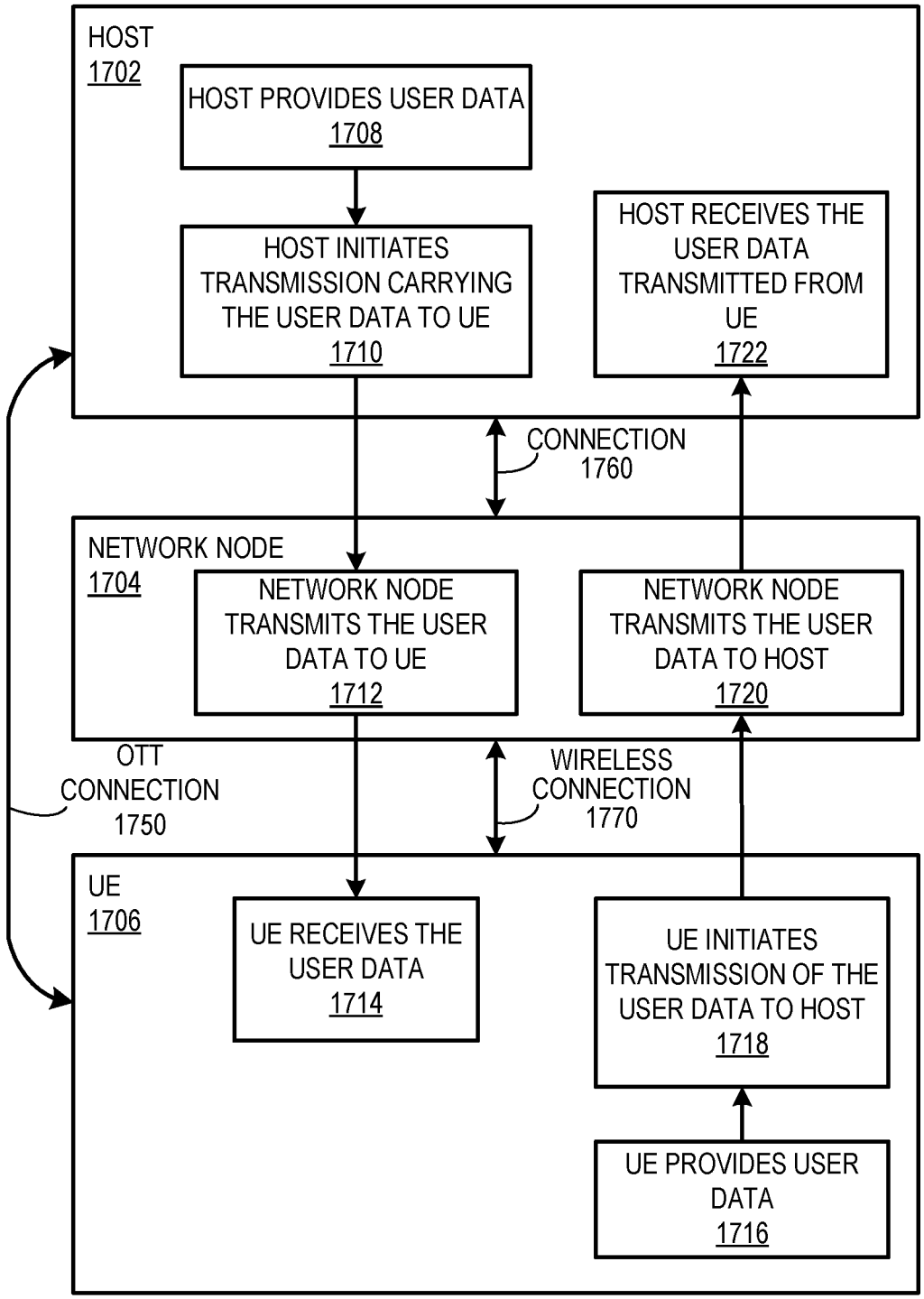
FIG. 17 shows a communication diagram of a host, according to an embodiment.

FIG. 17 shows a communication diagram of a host 1702 communicating via a network node 1704 with a UE 1706 over a partially wireless connection in accordance with some embodiments. Example implementations, in accordance with various embodiments, of the UE (such as a UE 1212a of FIG. 12 and/or UE 1300 of FIG. 13), network node (such as network node 1210a of FIG. 12 and/or network node 1400 of FIG. 14), and host (such as host 1216 of FIG. 12 and/or host 1500 of FIG. 15) discussed in the preceding paragraphs will now be described with reference to FIG. 17.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 12) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

One or more of the various embodiments improve the performance of OTT services provided to the UE 1706 using the OTT connection 1750, in which the wireless connection 1770 forms the last segment. More precisely, the teachings of these embodiments may improve the data rate, latency, power consumption and thereby provide benefits such as reduced user waiting time, better responsiveness, extended battery lifetime.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes; the sensors may participate in the measurement procedure by supplying values of the monitored quantities exemplified above, or supplying values of other physical quantities from which software may compute or estimate the monitored quantities. The reconfiguring of the OTT connection 1750 may include message format, retransmission settings, preferred routing etc.; the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The invention claimed is:

1. A method performed by a user equipment (UE), the method comprising:
   receiving a tracking reference signal (TRS) configured as a single port Channel State Information (CSI)-Reference Signal (RS) resource over multiple time instances;
   determining time domain properties of a channel, based on the received TRS;
   sending a report to a network node, the report comprising information about the determined time domain properties of the channel, wherein the information about the determined time domain properties of the channel comprises an auto-correlation function of the channel, wherein the method further comprises receiving a configuration for the report, wherein the configuration is a CSI report configuration comprising an indication of the TRS and an indication of reporting the auto-correlation function.

2. The method of claim 1, wherein the time domain properties of the channel represent channel variations over time.

3. The method of claim 1, further comprising receiving a configuration of the TRS.

4. The method of claim 1, wherein the indication of reporting the time domain properties is a configuration of a reporting quantity indicating the time domain properties to be reported.

5. The method of claim 1, wherein the CSI reporting configuration is a standalone CSI report which only contains configuration of time domain properties to be reported and does not contain other CSI reporting quantities.

6. The method of claim 1, wherein sending the report to the network node is based on the configuration for the report.

7. The method of claim 1, further comprising sending capability information to the network node, the capability information related to supporting estimation of time domain properties.

8. The method of claim 1, wherein the information about the determined time domain properties of the channel further comprises one or more of: a maximum Doppler frequency, a Doppler frequency spread, a level of crossing rate of the channel, a quantized or compressed version of one or more of an auto-correlation function, the maximum Doppler frequency, the Doppler frequency spread, and the level of crossing rate of the channel.

9. The method of claim 1, wherein sending the report comprises sending the report for a configured CSI band or for each CSI subband.

10. The method of claim 1, wherein the multiple time instances are within a slot, over different slots, or both within a slot and across different slots.

11. The method of claim 1, wherein, when the TRS is periodic or semi-persistent, determining the time domain properties is performed over one time period or over a duration of a plurality of periods of the TRS.

12. A method performed by a network node, the method comprising:
   sending a tracking reference signal (TRS) configured as a single port Channel State Information (CSI)-Reference Signal (RS) resource over multiple time instances to a user equipment (UE); and
   receiving a report from the UE, the report comprising information about time domain properties of a channel, the time domain properties of the channel determined based on the transmitted TRS, wherein the information about the determined time domain properties of the channel comprises an auto-correlation function of the channel, wherein the method further comprises sending a configuration for the report, wherein the configuration is a CSI report configuration comprising an indication of the TRS and an indication of reporting the auto-correlation function.

13. The method of claim 12, wherein the time domain properties of the channel represent channel variations over time.

14. The method of claim 12, further comprising transmitting a configuration of the TRS to the UE.

15. The method of claim 12, wherein the indication of reporting the time domain properties is a configuration of a reporting quantity indicating the time domain properties to be reported.

16. The method of claim 12, wherein the CSI reporting configuration is a standalone CSI report which only contains configuration of time domain properties to be reported and does not contain other CSI reporting quantities.

17. The method of claim 12, further comprising receiving capability information from the UE, the capability information of the UE related to supporting estimation of time domain properties.

18. The method of claim 12, wherein the information about the determined time domain properties of the channel further comprises one or more of: a maximum Doppler frequency, a Doppler frequency spread, a level of crossing rate of the channel, a quantized or compressed version of one or more of an auto-correlation function, the maximum Doppler frequency, the Doppler frequency spread, and the level of crossing rate of the channel.

19. The method of claim 12, wherein receiving the report comprises receiving the report for a configured band or for each subband.

20. A user equipment (UE) comprising a communication interface and processing circuitry connected thereto, the processing circuitry configured to:
receive a tracking reference signal (TRS) configured as a single port Channel State Information (CSI)-Reference Signal (RS) resource over multiple time instances;
determine time domain properties of a channel, based on the received TRS; and
send a report to a network node, the report comprising information about the determined time domain properties of the channel, wherein the information about the determined time domain properties of the channel comprises an auto-correlation function of the channel, wherein the method further comprises receiving a configuration for the report, wherein the configuration is a CSI report configuration comprising an indication of the TRS and an indication of reporting the auto-correlation function.

* * * * *